United States Patent [19]
Klem et al.

[11] 3,794,070
[45] Feb. 26, 1974

[54] PRECISION REFERENCE PRESSURE SUPPLY SYSTEM

[75] Inventors: Charles D. Klem, Phoenix; Robert T. Riall, Scottsdale; Richard A. Wallace, Phoenix, all of Ariz.

[73] Assignee: Sperry Rand Corporation, New York, N.Y.

[22] Filed: Mar. 20, 1972

[21] Appl. No.: 235,954

[52] U.S. Cl............................ 137/487.5, 137/624.11
[51] Int. Cl. ............................................ G05d 16/00
[58] Field of Search..................... 137/487.5, 624.11

[56] References Cited
UNITED STATES PATENTS

| | | | |
|---|---|---|---|
| 3,174,504 | 3/1965 | Rosenbrock | 137/487.5 X |
| 3,113,582 | 12/1963 | Hudson | 137/487.5 X |
| 3,464,438 | 9/1969 | Maurer | 137/487.5 |

*Primary Examiner*—Alan Cohan
*Attorney, Agent, or Firm*—Howard P. Terry

[57] ABSTRACT

A closed loop, selectively variable precision pressure reference system for testing pneumatic apparatus comprising all solid state digital control of a precision valve for establishing and maintaining the selected or desired reference pressure as a ratio between a positive pressure and a vacuum, the pressure ratio being sensed by a precision pressure sensor of the vibrating diaphragm type. The desired reference pressure is expressed as a binary word and the output of the pressure sensor is converted to a binary word, these two words being digitally compared and the difference therebetween being converted to an analog signal for adjusting the valve thereby closing the loop to maintain the selected pressure. The system is also capable of providing a precision pressure rate reference. The system automatically compensates for the inherent non-linear characteristics of the pressure sensor over its range of operation.

6 Claims, 2 Drawing Figures

PRECISION REFERENCE PRESSURE SUPPLY SYSTEM

BACKGROUND OF THE INVENTION

1. Field of the Invention

The present invention relates generally to pneumatic test equipment and more particularly to apparatus for providing a precision pressure reference source especially applicable as a laboratory tool and in one application to the testing of aircraft air data systems.

2. Description of the Prior Art

Pressure reference sources have been known and used for many years as a laboratory and manufacturing testing tools as well as for testing and maintaining pneumatic systems such as air data systems for aircraft. In general these systems have relied on the so called quartz tube system and the well known mercury manometric system. Both of these systems have objectionable characteristics. For example, both the quartz tube system and manometric system both involve servoed sensors and are thus subject to servo lag. Also, because of the physical nature of these devices it is difficult to isolate them from ambient conditions and hence their stability leave something to be desired. Their greatest drawback however is their inherent delicateness and large size rendering them difficult, if not impossible, to be moved, i.e., they are permanent installations.

More recently, there has been proposed a pressure reference system similar in many respects to the present system in which a valve means is used to establish a desired reference pressure as a predetermined ratio between a predetermined pressure source and a vacuum, which reference pressure is detected by a pressure sensor, converted into an electric signal and fed back for comparison with a signal representing the desired pressure the difference controlling the servo valve such as to reduce the difference to zero. This closed loop system is completely analog and depends on a phase comparison of the desired reference pressure signal and the feedback sensor signal and therefore is subject to errors associated with analog servo loops.

SUMMARY OF THE INVENTION

The present invention overcomes all of the disadvantages of prior systems set forth above. It provides a pressure reference system that is more rugged and portable than the conventional manometric or quartz tube systems and is far less complex in its control circuitry and considerably less expensive. Furthermore, since the controlling error signal for the valve positioning loop is derived in digital format it is therefore more precise and rapid in operation.

Basically, the desired pressure reference is established either manually or automatically (if used with a digital automatic test equipment) as a 20 bit parallel binary word and stored in an input register. The actual pressure in the reference pressure chamber is detected by a pressure sensor, whose output is a signal having a period or frequency dependent upon such pressure. This pressure transducer is preferably of the type disclosed in U.S. Pat. No. 3,456,508 entitled, "Vibrating Diaphragm Pressure Sensor Apparatus" issued July 22, 1969 in the name of R. H. Frische assigned to the same assignee as the present invention. This sensor signal is converted to a 20 bit parallel binary word and stored in a further register. The outputs of these registers are supplied to a digital subtractor which determines their difference and supplies a binary word in accordance therewith. The digital difference signal is converted to an analog signal which is used to position a pneumatic valve for controlling the pressure within the reference pressure chamber, and detected by the pressure transducer, in a sense and to an amount to reduce said binary difference signal to zero. Since the valve requires a particular position to maintain the reference pressure, an integral path in the forward loop is required. Additional compensations are also provided. The vibration frequency versus pressure characteristic of the pressure transducers is non-linear and therefore the analog error signal supplied to the pressure control valve is gain controlled in a manner to compensate for this non-linearity. Further, provision is made for rapidly slewing the reference pressure to the desired pressure when the difference binary signal exceeds a predetermined value. This not only improves system response but also reduces the requirements of the digital-to-analog converter. In addition to providing a precise reference pressure, means are also provided for supplying a precise and selectable reference pressure rate, a feature particularly useful in testing aircraft air data equipment. Suitable digital data entry and reply indicators are provided for manual operation.

BRIEF DESCRIQTION OF THE DRAWINGS

FIG. 1a together with 1b is a schematic block diagram of the precision pneumatic pressure reference system embodying the teachings of the present invention.

DESCRIPTION OF THE PREFERRED EMBODIMENT

The preferred embodiment of the present invention constitutes pneumatic pressure reference equipment which may be employed with larger automatic test equipment for airborne avionic equipment and is primarily designed for use in testing air data subsystems of said airborne avionic equipment. In testing such air data equipment a source of accurate pneumatic pressure is required and this reference must be capable of supplying pressure ($P_S$) corresponding to various altitudes, for example, ranging from sea level to over eighty thousand feet and pressure rates ($P_S$) corresponding to rates of climb or dive ranging from a few feet per second to several thousand feet per second. Also, the same type of pressure reference equipment may be used to test airspeed and Mach number portions of the air data subsystems, the only basic difference being that the reference pressure $P_T$ includes the above $P_S$ pressure, i.e., the systems are for all intents and purposes, identical and hence the present specification will describe only the $P_S$ section.

Figure 1A:
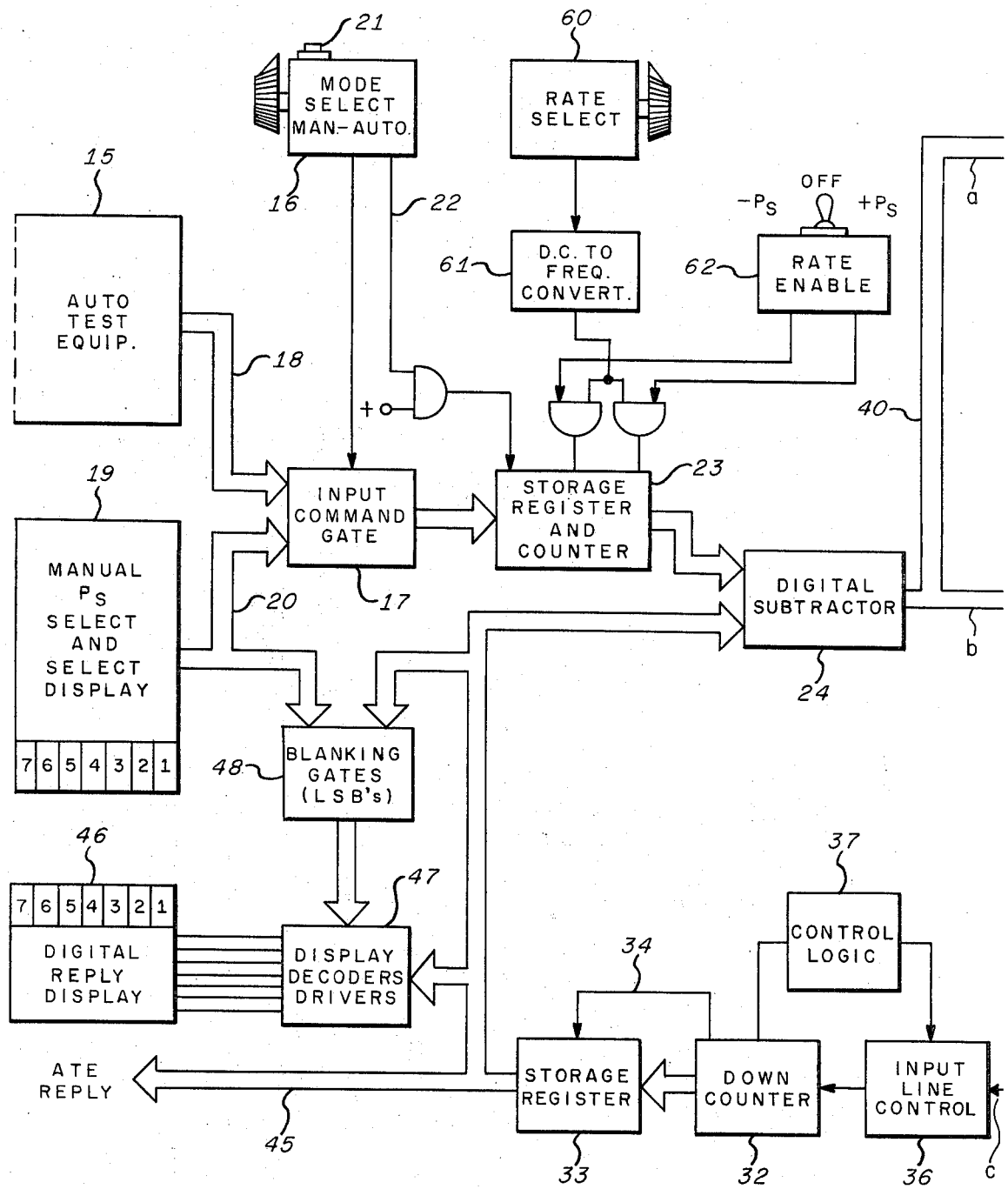
Figure 1B:
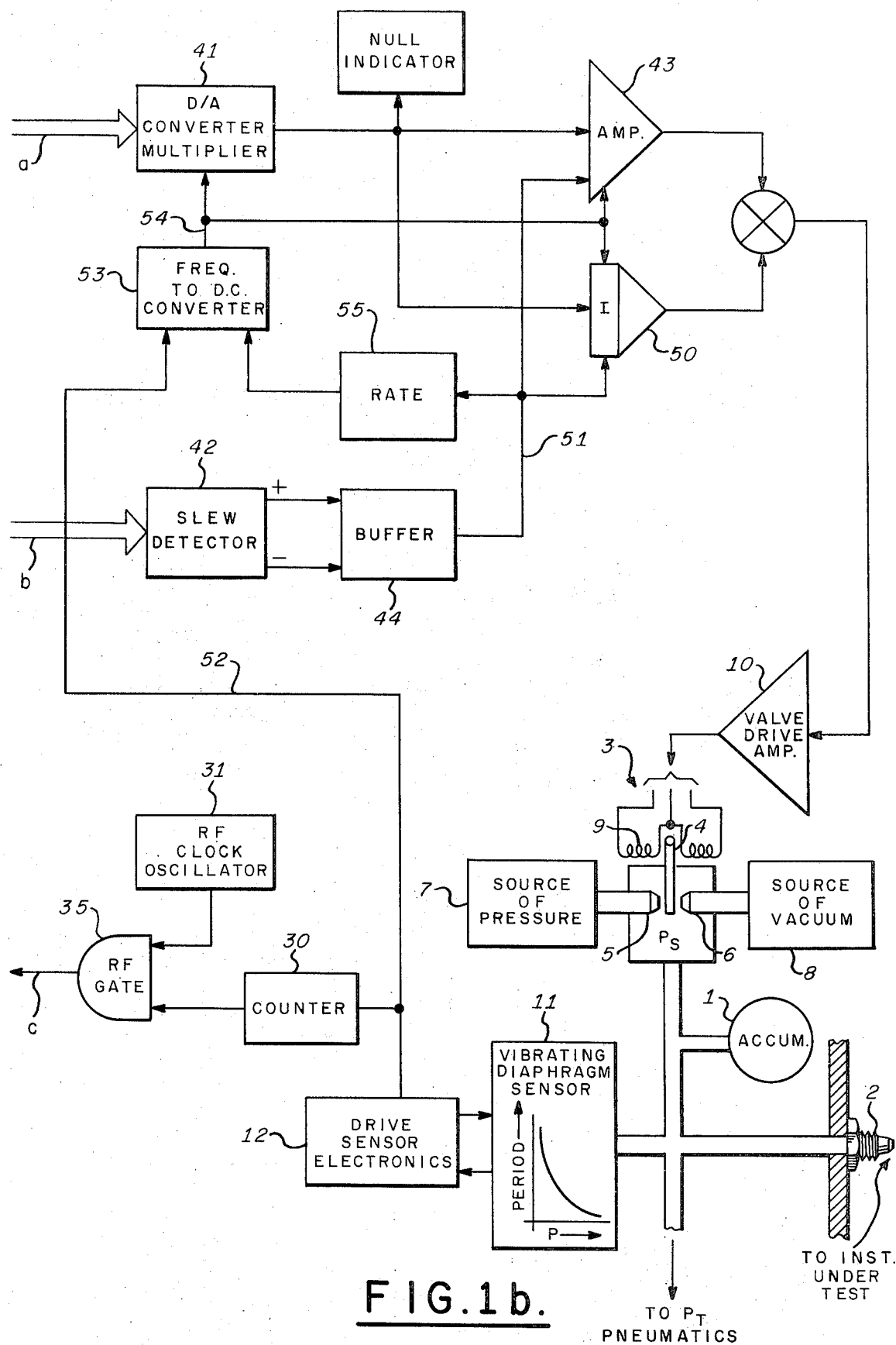

Referring now to FIG. 1, the source of reference pneumatic pressure $P_S$ will first be described. A pressure chamber 1 constitutes the pressure reference source which is connected to an output pneumatic connection 2 adapted to be connected to the $P_S$ (static) sensor input of the air data system being tested (not shown) as the output load. The pressure within the chamber or accumulator 1 is precisely regulated by a precision pneumatic valve schematically illustrated at 3, which preferably may be of the well known "flapper-valve" type or alternatively of the type shown in U.S. Pat. No. 2,936,783 entitled, "Electrohydraulic Servo Control Valve" issued May 17, 1960 in the name of R. A. Moffatt and assigned to the same assignee as the present invention. This type of valve comprises control element or flapper 4 the position of which relative to parts 5 and 6 control the ratio of pneumatic pressures from two sources, a source of positive pressure 7 and a source of negative pressure or vacuum 8. By precisely controlling the valve position, any value of pressure $P_S$ may be established in the accumulator or reference chamber 1, the position of valve flapper 4 is electrically controlled by the signal supplied to valve positioning coils 9 from valve drive amplifier 10 as will be described below.

The reference pressure existing within chamber 1 is detected by means of a pressure sensor or transducer 11. This sensor is preferably of the type disclosed in the above-referred to U.S. Pat. No. 3,456,508 and indeed it is the precision of this transducer which greatly contributes to the precision of the overall system. As described in this patent, the transducer comprises a diaphragm one side of which is subject to zero or vacuum pressure and the other side of which is subjected to the pressure $P_S$ to be regulated. The principle of operation of the transducer 11 is based on the natural vibration characteristic of a flat diaphragm secured only at its periphery when subjected to varying pressure loads. Thus, as the diaphragm is deflected more or less by changes in the pressure applied to it, its stiffness changes and its mechanical resonant frequency changes as a direct function of the applied pressure. The diaphragm is therefore constructed as part of an electromechanical resonant system comprising the diaphragm and its drive/sense electronics 12, the frequency of which is a direct function of the reference pressure $P_S$. In essence therefore the output of drive/sense electronics circuit 12 is a signal having a frequency that varies with the pressure $P_S$. The advantage of this type of pressure signal is that it is readily adaptable to digital techniques as will be described below.

In accordance with the teachings of the present invention, the reference pressure to be established and maintained within chamber 1 is selectably controlled either manually or automatically, through associated automatic test equipment, using a solid state digitally controlled closed loop servo system in which the generation of the loop error signal is derived digitally thereby improving the accuracy and response of known systems. If the system of the present invention is coupled with automatic test equipment schematically illustrated at 15, the selector switch 16 is switched to AUTO and the reference pressure is automatically programmed into input command gate 17 as a 20 bit parallel binary word via parallel data bus 18 in accordance with a preprogrammed air data equipment test sequence. The equipment under test is connected to output port 2 and the programmed reference pressure applied thereto. In practice, of course, the performance of the equipment under test is monitored by the automatic test equipment but this function is not pertinent to the present invention.

If the system of the present invention is to be operated manually, switch 16 is set to MAN and the reference pressure is manually selected by means of manual select and select display unit 19. This unit comprises a seven digit octal pushbutton array, each pushbutton (except one, of course) supplying three binary digits of a 20 bit binary word representation of the desired or commanded reference pressure $P_S$. Such digital input displays are conventional and familiar to those skilled in the art. The operator uses an arbitrary conversion code for entering the commanded pressure. Selection of MAN on mode selector 16 also conditions input command gate 17 to transfer the selected 20 bit word to storage register and counter 23. After setting up the commanded pressure reference, the operator depresses the command enter button 21 which, via lead 22, controls logic that transfers the stored command word in register 23 to the digital subtractor 24. Storage register 23 is a conventional 20 bit latchable register well known in the art. The pressure rate function associated with register and counter 23 will be described later.

As stated, the vibrating diaphragm pressure sensor 11 and its drive/sensor electronics 12 supplies an output frequency as a precise function of the pressure within chamber 1. The pressure versus period characteristic is as illustrated and is quite non-linear; for variations in pressures at high pressures, e.g. sea level, the period variation is small while at low pressures, e.g. high altitudes, the period variation is quite large. Means have been provided for completely compensating for this characteristic as will be described.

The frequency output of the transducer electronics 12 is precisely convertible to a digital word. The sensor frequency is divided by a hexidecimal counter 30 that acts through gate 35 to enable and disable at equal time intervals a standard, stable high frequency clock 31 by means of suitable logic at the input of down counter 32 through input line switches 36 which control count gain. When the gate generator 30 enables the down counter 32, clock pulses are accumulated in a 20 bit storage register 33 resulting in a stored digital word proportional to the pressure $P_S$ within accumulator 1. Upon a disabling signal from counter 30, indicating completion of the down count of counter 32, a latching signal is supplied via lead 34 to register 33 which transfers its contents to digital subtractor 24.

Subtractor 2 is a conventional digital subtractor operating conventionally as a complement adder. Thus the digital signal representing the commanded pressure is compared with the digital signal representing the existing actual pressure in accumulator 1 thereby providing at the output of subtractor 24 a 20 bit digital word representing the difference therebetween, i.e., a digital error word. This error word is supplied via 20 bit parallel bus 40 to a digital-to-analog converter/multiplier 41 and to a slew detector 42. In general, the D/A converter 41 is a 12 bit device, since it only has to look at the first 12 bits of the error word. If the significant bits of the error word exceed twelve, the slew switch 42 recognizes this and supplies a large plus or minus slew signal, depending on the sense of the error, to valve amplifier 43 through a suitable buffer amplifier 44. The D/A converter multiplier is a conventional 12 bit R–2R ladder driven by transistor bit switches set by the 12 least significant bits of the digital error signal from subtractor 24. For gain control purposes to be explained below, the D/A converter 41 includes a multiplying function. This is accomplished by varying the reference voltage supplied to the R–2R ladder so that the output of the connector/multiplier will be the product of the reference voltage and the binary number set by the bit switches. A suitable D/A converter adapted as described above to provide the multiple function is shown in Applicant's assignee's copending application Ser.

No. 225,794, filed Feb. 14, 1972 in the name of Frank Kallio and entitled Bi Polar Digital to Analog Converter.

Thus, the input to amplifier 43 is either a fixed constant d.c. voltage from slew detector 42 or a variable, gain controlled voltage from D/A converter 41 proportional to the 12 least significant bits of the digital error signal from subtractor 24. The output of amplifier 43 is applied to valve drive amplifier 10 which energizes valve windings 9 to thereby position flapper valve 4 and change the valve of pressure $P_S$ in accordance with the system error. This change in $P_S$ will of course be reflected in a corresponding change in the output of transducer 11 and thus its digital word to subtractor 24 such as to reduce the error output thereof to zero. Thus, the reference pressure $P_S$ in chamber 1 corresponds to that commanded by the manual $P_S$ select panel 19 or by the ATE 15. If the ATE mode is selected, the digital output of transducer 11 is supplied via ATE reply bus 45 back to the ATE to thereby close the ATE loop. If the manual mode is selected, the digital output of transducer 11 is supplied via bus 45 to a 7 digit digital reply display 46 through conventional decoder/driver circuits 47 whereby the numbers displayed on reply display 46 corresponds with the number displayed on the select display 19. If desired, the least significant bits of the 20 bit word may be blanked in order to eliminate any annoying dither of the lower of displayed digits. This is accomplished by means of a series of blanking gates 48 responsive to the digital reply word from register 33 and to an internal memory set by the command word on bus 20 from select panel 19. These gates control the display decoder/drivers associated with the lowest order numerals to be responsive to every second, fourth, eighth, etc. bit depending upon the pressure selected. This digit dither suppression is most desirable when low (high altitude) pressures are selected due to the reduced sensitivity characteristic of the transducer 11 at low pressures.

Since, the position of flapper valve 4 determines the reference pressure $P_S$, this position must be accurately established and maintained. Thus, the output signal from D/A converter 41 is supplied to the amplifier 43 which controls valve drive amplifier 10 to establish the required position of the valve 4. This error signal output is also supplied to an integrator 50 which supplies at its output the integral of the error signal which serves to maintain the required valve position as the error signal is reduced to zero. It will be noted however that if the slew detector is supplying the error signal to the valve amplifier, the integrator 50 is clamped via lead 51 responsive to the output of buffer 44. The purpose of this is to prevent the integrator from having a destabilizing effect on the servo loop by preventing a rapid buildup of the integral signal by the large slewing signal. As soon as the error reduces to the point where the D/A converter takes over, the integrator is unclamped and functions in its normal manner.

In accordance with further features of the present invention, means are provided for increasing the precession and response of the pressure reference system at extremes of pressures by controlling system characteristics in accordance with the characteristics of the vibrating diaphragm pressure transducer 11. As illustrated, at low pressures, the vibration period of the sensor varies rapidly with small changes in pressure while at high pressures, the vibration period varies relatively slowly. Therefore, in order to accurately position the flapper valve 4 in the high pressure region the gain of the valve positioning loop is increased. This is accomplished by looking at the output of the pressure transducer 11 and varying the output of the D/A converter/multiplier 41 as a function thereof.

Thus, the output of the transducer drive/sense electronics 12 is supplied via lead 52 to a frequency to d.c. converter 53 which supplies a signal at its output 54 that increases in value as the vibration period (or frequency) decreases. This signal provides the reference voltage for the ladder of the D/A converter 41 and effectively performs a multiplication function to gain program the analog output of the converter. A further gain adjustment may be provided by directly controlling the gain of amplifier 43 in accordance with the output 54 of frequency to d.c. converter 53. Also, in order to maintain stable control of the valve, the gain of the integrator 50 is likewise varied as a function of the diagram period.

A further compensating means is provided for increasing the response of the flapper valve 4 to the error signal when in the high pressure region. It will be recalled that when the slew detector 42 is effective, the integrator 53 is clamped. When operating in the high pressure region, it is desired rapidly to bring the integrator output up toward its final valve when the slew signal is removed so as not to introduce any objectionable lag. This is accomplished by means of the frequency to d.c. converter 53, the output slew detector buffer 44, and a rate circuit 55 coupled therebetween. When, under the control of the slew detector 42, the pressure changes such as to reduce the digital error to the threshold of the D/A converter, the slew detector is turned off. Its collapsing d.c. signal is applied to rate circuit 55 and, as characteristic of such circuits, produces a substantial pulse of energy. If operating in the high pressure region, as detected by suitable logic responsive to the frequency of the pressure transducer output, this pulse is applied to the integrator 50 to rapidly bring its output up near its final value.

In accordance with a further feature of the present invention, means are provided for supplying a precision reference pressure rate. This is particularly useful in testing aircraft air data equipment for proper rate of climb and drive operation and airspeed rate operation etc. For this purpose the system includes a reference pressure rate selector 60 which may include a knob and dial arrangement calibrated for example, in feet per second in the $P_S$ embodiment herein illustrated. Setting of this knob to the desired value of pressure rate provides a corresponding d.c. voltage which is supplied to a conventional d.c. to frequency converter 61 which in turn supplies at its output a corresponding pulse train having a repetition frequency corresponding to the desired pressure rate. This signal is applied to suitable logic gates having control inputs for determining the sense of the selected pressure rate. For this purpose a simple spring loaded center off double pole switch 62 supplies a plus or minus d.c. signal to the sense gates to gate the pulse train into register 23. The register 23 is conditioned in this rate mode simply to continuously count the pulses supplied to it to thereby continuously increase or decrease the digital word supplied to the subtractor 24 at the rate established by the pulse train frequency. The error signal is processed as above described to vary the valve 4 position and hence vary the pressure in accumulator 1 at the selected rate. The pressure transducer senses this changing pressure and the output frequency of its sensor 12 varies at a corresponding rate. Upon release of the switch 62 the system stabilizes out at whatever pressure was established at switch release.

In the embodiment of the present invention described above, the vibrating diaphragm is temperature sensitive so that in order to maintain accuracy of the reference pressure under varying embodiments, the sensor and its associated critical electronics are enclosed in an insulated, temperature regulated enclosure. The operating pressure range of the system is less than one to more than 45 inches of mercury for $P_S$ and from less than 1 to 120 inches of mercury for $P_T$. The digital output resolution (using the 20 bit word) which varies with pressure ranges from about 0.5 milli-inch Hg at the high pressure regions to 0.05 milli-inch at the low pressure regions.

In order to achieve a more constant sensitivity in digital output resolution the contents of the down counter 32 may be used in conjunction with a programmable control logic 37 and counter input line control switches 36 which increase or decrease the counting rate of the down counter 32 as a function of its own contents. This feature in conjunction with the use of a down counter permits the output digital function from storage register 33 to be made approximately linear with output pressure. This technique can be used to achieve a direct pressure readout in inches of mercury or millibars by designing the control logic 37 and input line control switch intervals to achieve good sensor curve fit. Of course, using the digital techniques of the present invention, greater accuracies can be realized by increasing the bit length of the digital word.

While the present invention has been described in a preferred embodiment, it is to be understood that the words which have been used are words of description rather than limitation and that many changes may be made in these constructions within the purview of the following claims without departing from the true scope and spirit of the invention in its broader aspects.

We claim:

1. A reference pneumatic pressure supply system, the combination comprising
   a reference pressure chamber,
   positionable valve means coupled with said chamber and a source of high pneumatic pressure and a source of low pneumatic pressure and adapted to control the resultant of said pressures within said chamber,
   means for providing a first multi-bit digital word corresponding to a selected pneumatic pressure reference,
   pressure sensor means responsive to the pressure in said chamber for providing a second multi-bit-digital word corresponding to the pneumatic pressure within said chamber,
   means responsive to said digital words for providing a third multi-bit digital word corresponding to the difference therebetween,
   digital-to-analog converter means responsive to said difference word for providing an analog error signal corresponding thereto,
   means responsive to said analog error signal for positioning said valve means in a sense and to an amount to reduce said third digital word to zero,
   slew detector means responsive to the most significant bits of said third multi-bit digital word for providing a constant analog voltage output corresponding in sense to the sense of said difference word, and
   means for supplying said constant voltage to said valve positioning means whereby to slew the pressure existing in said reference pressure chamber rapidly toward said selected reference pressure.

2. The reference pressure supply system as set forth in claim 1 wherein said digital-to-analog converter means is responsive only to the least significant bits of said digital difference word below the most significant bits thereof to which said slew detector means is responsive.

3. The reference pressure supply system as set forth in claim 1 wherein said valve positioning means further includes integrator means responsive to said analog error signal for maintaining said valve position as said error signal is reduced to zero, said system further including means responsive to an output of said slew detector means for clamping said integrator.

4. The reference pressure supply means as set forth in claim 3 further including,
   means responsive to the rate of change of the output of said slew detector for supplying a signal pulse upon the output of said slew detector going to zero and,
   means for supplying said signal pulse to said integrator means to rapidly increase the output of said integrator.

5. A reference pressure supply system comprising the combination of
   a reference pressure chamber,
   positionable valve means coupled with said chamber and a source of high pneumatic pressure and a source of low pneumatic pressure and adapted to control the resultant of said pressures within said chamber,
   means for providing a first multi-bit word corresponding to a selected pneumatic pressure reference,
   pressure sensor means responsive to the pressure in said chamber for providing an electrical output signal having a frequency which varies as a non-linear function of said chamber pressure,
   converter means responsive to said sensor signal for providing a further signal having an amplitude proportional to the frequency of said sensor signal,
   frequency-to-digital converter means for converting said sensor frequency to a second multi-bit digital word corresponding to the pneumatic pressure within said chamber,
   means responsive to said first and second multi-bit digital words for providing a third multi-bit digital word corresponding to the difference therebetween,
   digital-to-analog converter means responsive to said difference word for providing an analog error signal corresponding thereto,
   means for supplying said further signal to said digital-to-analog converter means whereby to vary the amplitude of the analog output thereof as a function of said sensor frequency, and
   means responsive to said analog error signal for positioning said valve means in a sense and to an amount to reduce said third digital word to zero whereby to establish and maintain the resultant pressure in said reference pressure chamber in accordance with said selected pressure.

6. The reference pressure supply system as set forth in claim 5 wherein said valve positioning means further includes variable gain integrator means responsive to said analog error signal for maintaining said valve position as said error signal is reduced to zero, and means responsive to said further signal proportional to sensor frequency for controlling the gain of said integration means.

* * * * *